United States Patent Office 3,518,332
Patented June 30, 1970

3,518,332
METHOD FOR MAKING THIN, MICRO-POROUS FLUOROCARBON POLYMER SHEET MATERIAL
Jack C. Sklarchuk, Trenton, N.J., and William F. Kobie, Philadelphia, Pa., assignors to ESB Incorporated, a corporation of Delaware
No Drawing. Filed Nov. 22, 1967, Ser. No. 684,921
Int. Cl. B29d 27/08
U.S. Cl. 264—49        7 Claims

ABSTRACT OF THE DISCLOSURE

A method for making thin, microporous fluorocarbon polymer sheet material comprising forming a mixture of fluorocarbon polymer particles, metallic salt particles, and a paraffin wax material. This mixture is formed into a sheet material and the paraffin wax is removed by treating the sheet with a petroleum solvent. Then the sheets are sintered prior to removal of the pore-former salt, and after the sintering operation, the pore-former salt is removed by leaching with a suitable solvent.

BACKGROUND OF THE INVENTION

The present state of fuel cell development requires the use of very expensive catalyst materials for both oxygen and fuel electrodes and also requires complicated auxiliary equipment for efficient operation. In order to avoid these disadvantages of fuel cell power systems, alternative power sources were investigated, including air-metal cells. It was decided that an air-metal cell having an air or oxygen electrode capable of "breathing" oxygen from air would be a substantial improvement for it would eliminate the need for oxygen tanks and other auxiliary equipment.

During the development of a "breathing" air electrode, it was determined that a thin, hydrophobic sheet material having uniform microporosity would be required to make such an electrode. Commercially available polytetrafluoroethylene sheet material was tried, but it was expensive and did not have uniform porosity.

SUMMARY OF THE INVENTION

A method for making thin, microporous fluorocarbon polymer sheet material has been developed to produce a sheet material having a uniform microporosity. The method comprises forming a mixture of fluorocarbon polymer particles, metallic salt particles which function as a pore-forming ingredient, and a paraffin wax which functions as a binder and a lubricant. The mixture is generally formed by mixing the fluorocarbon polymer particles and the pore-former salt in a high speed blender to form a homogeneous mixture, and then a small amount of paraffin wax is mixed into the mixture.

The mixture is then formed into a sheet material using conventional means such as a rubber mill. After the mixture is formed into a sheet, the paraffin wax is removed by treating the sheet with a petroleum solvent such as immersion in an acetone bath. Then the sheets are placed in a cold sintering furnace to be sintered prior to removal of the pore-former salt. Since the pore-former salt must be able to withstand the sintering temperature without any substantial deterioration, metallic salts which are easily removed by a suitable solvent are preferred. The temperature of the sintering furnace is raised to the sintering temperature of the fluorocarbon polymer which is sintered for about ½ to 1 hour. After the sheet is sintered, it is treated with a solvent to remove the pore-former.

DETAILED DESCRIPTION

This invention relates to a method for preparing thin, microporous fluorocarbon polymer sheet material having a uniform microporosity which is useful in preparing electrodes capable of "breathing" oxygen from air. The microporous sheet material required for the "breathing" air electrode must be hydrophobic to prevent absorption of the aqueous electrolyte and must have a uniform microporosity to prevent electrolyte leakage. In order to provide the hydrophobic property, fluorocarbon polymers, such as polytetrafluoroethylene, polytrifluoroethylene, polyvinyl fluoride, polyvinylidene fluoride, polytrifluorochloroethylene and copolymers thereof, may be used to prepare the microporous sheet material.

In accordance with this invention, fluorocarbon polymer particles are mixed with a particulate metallic salt pore-former to form a composition capable of being rendered microporous by treatment with a suitable solvent for the pore-former. Examples of metallic salts which have been used successfully as pore-formers are calcium formated sodium chloride and sodium carbonate. As previously indicated, the pore-former must be able to withstand the high temperatures required to sinter the fluorocarbon polymer, and for this reason metallic salts are preferred. In addition, many metallic salts are highly soluble in water and so they are easily removed without adversely affecting the fluorocarbon polymer.

It is essential that the microporosity of the fluorocarbon polymer sheet material be carefully controlled in order to provide a material which will not "leak" electrolyte after it is applied to the air electrode. It has been found that the pore-former particles should be classified before being mixed with the fluorocarbon polymer and that only those particles which pass through a 200 mesh screen, having a particle size of about 73 microns or less, should be used. It is particularly preferred that only those pore-forming particles passing through a 325 mesh screen, having a particle size of about 40 microns or less, be used. In addition, since the pore-former is a fine powder and its uniform particle size is essential, the pore-former should be used immediately after classification to prevent agglomeration of the particles.

After the fluorocarbon polymer and the pore-former are thoroughly mixed in a high speed blender, it is essential that a paraffin wax be incorporated into the mixture. The wax performs a dual function. It serves as a binder for the fluorocarbon polymer and the pore-former, and it lubricates the mixture during its processing, particularly the sheeting operation.

The proportions of the ingredients in the mixture may vary, though generally the pore-former is present in about 3 to 7 parts by weight per part of fluorocarbon polymer. A ration of 5 parts pore-former to 1 part fluorocarbon polymer has yielded satisfactory results. The paraffin wax is added in amounts ranging from about 10 to about 20% by weight of the polymer/pore-former mix.

After the fluorocarbon polymer/pore-former paraffin/wax composition is thoroughly mixed, the mixture is formed into sheets. A rubber mill having heated rollers may be used to form the mixture into sheets. It is desirable to coat the rolls of the mill with paraffin wax before adding the mix to facilitate processing, especially removal of the sheeted mix from the rolls. Using a rubber mill, sheets less than 10 mils in thickness have been prepared and this was not possible using a doctor blade to spread the mix. Sheets having a thickness ranging from 5 to 40 mils have been successfully prepared in accordance with this invention.

Following the forming of the sheets, the sheet material is treated with a solvent to remove the paraffin wax. This may be accomplished by immersing the sheets in a warm petroleum solvent, such as acetone, for about ½ hour. The wax must be removed before sintering or it discolors the sheet and causes it to become brittle.

It is essential that the sheet material be sintered prior to removing the pore-forming particles. If the sheets are not sintered, removal of the pore-former will cause the sheet to collapse in thickness and porosity may be reduced or rendered non-uniform. The sheets may be placed in a cold sintering furnace (a hot furnace might cause warping of the sheet material) and slowly heated to the sintering temperature of the fluorocarbon polymer (about 650° F. for polytetrafluoroethylene). The sheet material may be held at the sintering temperature for about ½ to 1 hour.

After completion of sintering, the metallic salt pore-former is removed by treating the sintered sheet with a solvent for the pore-former. It is preferred that the pore-former be water-soluble, in which case, it can be removed simply by immersing the sheet in warm water. Depending on the solubility of the pore-former and the thickness of the sheet, removal of the pore-former may require immersion in the leaching solvent for about ½ to about 24 hours. It is preferred to use fresh leaching solvent periodically to ensure substantially complete removal of the pore-former.

The thin, microporous fluorocarbon polymer sheet material prepared in accordance with this invention is particularly useful as a backing material for air electrodes in a metal-air battery. This material has uniform microporosity and it is hydrophobic, which makes it possible to prepare air electrodes capable of "breathing" air and which are substantially leakproof. Other possible uses for this material are those applications which require microporous materials such as battery separators, filters, etc.

The following examples illustrate the preparation of microporous fluorocarbon polymer sheet material in accordance with this invention.

EXAMPLE I

Calcium formate ($Ca(CHO_2)_2$) was dried at 248° F. and sieved through a −325 mesh screen. A 2/1 mix was prepared by mixing 100 g. of the $Ca(CHO_2)_2$ powder with 83.3 g. of a polytetrafluoroethylene emulsion (Teflon 30) containing 50 g. of polytetrafluoroethylene polymer. The emulsion was diluted to 50 cc. with water, stirred rapidly, and then the $Ca(CHO_2)_2$ powder was added slowly. After thoroughly mixing this composition for 10 minutes, it was dried at 257° F. to complete dryness and then reduced to microparticles in a high speed blender. 15 g. of paraffin wax was thoroughly mixed into this composition prior to forming it into sheet material.

A rubber mill was used to form sheets from the blended mix. The back roll of the mill was heated to 140° F. and the front roll to 160° F. The spacing of the rolls was adjusted to yield a sheet 20 mils thick. The powdered mix was poured onto the rubber mill, rolled once, stripped off of the back mill roll, folded over and rolled again. This rolling-stripping-rolling procedure was repeated to ensure correct thickness and uniformity, after which the material was stripped from the back roll and retained as sheet material. The sheets were allowed to cool and became stiff but durable and easily handled.

The rolled sheets were then placed in a Soxhlet Extractor containing warm acetone (just below boiling point) to remove the paraffin wax. This extraction process required about ½ hour. The excess acetone carried by the sheet material was blotted off, and the sheet was placed in a cold sintering furnace. The furnace was heated slowly to 650° F., and the polytetrafluoroethylene was sintered at 650° F. for about ½ hour. After the sheet material had cooled to room temperature, the $Ca(CHO_2)_2$ was removed by immersing the sheet in warm water (192° F.). To ensure complete removal of the $Ca(CHO_2)_2$ pore-former, the sheet was immersed in the warm water for 16 hours (overnight) and during this time, fresh leaching water was introduced on 3 occasions. Then the sheet was removed from the warm water and dried to form a thin, microporous, flexible polytetrafluoroethylene sheet.

The quality of the microporous sheet material may be controlled by subjecting a sample from each sheet to a permeability test. This may comprise forcing nitrogen through a 1 inch diameter sample under a constant level of water. If any sample has an abnormal gassing pressure or non-uniform pore distribution, it may be discarded.

EXAMPLE II 500 grams of sodium carbonate ($Na_2CO_3$) was sieved through a −325 mesh screen and was mixed with 100 grams of a powdered tetrafluoroethylene polymer (Teflon 7) in a suitable blender (Patterson-Kelly intensifier). Then 90 grams of powdered paraffin wax was incorporated into the composition and the entire composition was mixed for 5 minutes in the blender.

A 2-roll rubber mill was used to form sheets from the blended polymer-wax-$Na_2CO_3$ composition, with the back roll of the mill heated to 150° F. and the front roll to 160° F. The spacing of the rolls was adjusted to yield a sheet 20 mils thick. The powdered mix was poured onto the rubber mill, rolled once, stripped off of the mill rolls, folded over and rolled again. This rolling-stripping-rolling procedure was repeated to ensure correct thickness and uniformity, after which the material was stripped from the rolls in sheet form. The sheets were allowed to cool and became stiff but easily handled.

The rolled sheets were then placed in a Soxhlet Extractor containing warm acetone (just below boiling point) to remove the paraffin wax. This extraction process required about ½ hour. The excess acetone carried by the sheet material was removed by blotting, and the sheet material was placed in a sintering furnace. The sheet material was sintered between perforated ceramic plates at 650° F. for ½ hour. After the sheet material had cooled to room temperature, the $Na_2CO_3$ pore-former was removed by immersing the sheet material in warm water (192° F.). To ensure complete removal of the $Na_2CO_3$ pore former, the sheet material was immersed in warm water for about 16 hours (overnight), and upon removal from the warm water, it was dried to form a thin, microporous, flexible polytetrafluoroethylene sheet.

EXAMPLE III

Calcium formate ($Ca(CHO_2)_2$) was dried at 248° F. and sieved through a −325 mesh screen. A 5/1 mix was prepared by mixing 250 g. of the $Ca(CHO_2)_2$ powder with 83.3 g. of a polytetrafluoroethylene emulsion (Teflon 30) containing 50 g. of polytetrafluoroethylene polymer. The emulsion was diluted to 50 cc. with water, stirred rapidly, and then the $Ca(CHO_2)_2$ powder was added slowly. After thoroughly mixing this composition for 10 minutes, it was dried at 257° F. to complete dryness and then reduced to microparticles in a high speed blender. 15 g. of paraffin wax was thoroughly mixed into this composition prior to forming it into sheet material.

A rubber mill was used to form sheets from the blended mix. The back roll of the mill was heated to 140° F. and the front roll to 160° F. The spacing of the rolls was adjusted to yield a sheet 20 mils thick. The powdered mix was poured onto the rubber mill, rolled once, stripped off of the mill roll, folded over and rolled again. This rolling-stripping-rolling procedure was repeated to ensure correct thickness and uniformity, after which the material was stripped from the rolls and retained as sheet material. The sheets were allowed to cool and became stiff but durable and easily handled.

The rolled sheets were then placed in a Soxhlet Extractor containing warm acetone (just below boiling point) to remove the paraffin wax. This extraction process required about ½ hour. The excess acetone carried by the sheet material was blotted off, and the sheet was placed in a cold sintering furnace. The furnace was heated to 650°

F. and the polytetrafluoroethylene was sintered at 650° F. for about ½ hour, and thereafter, it was permitted to cool to room temperature.

A catalyst composition was prepared by forming an aqueous slurry of 5% platinum catalyst deposited on a carbon carrier, which is commercially available (Englehard). This slurry was stirred rapidly and a diluted solution of a polytetrafluoroethylene emulsion (Teflon 30) was slowly added to the slurry in an amount to provide 20% by weight of polytetrafluoroethylene per weight of the total dry catalyst composition. After mixing the polytetrafluoroethylene into the catalyst composition to form a homogeneous mixture, the composition was washed thoroughly in water, then in acetone and again in water. 3 g. of this wet proofed catalyst composition was pressed into a clean 75 mesh nickel screen at 14,000 p.s.i. and at room temperature, forming an air electrode having an area on each side of 2.5 inches by 2.5 inches.

Onto one side of the air electrode, a piece of the sintered polytetrafluoroethylene sheet material, still containing the sodium carbonate pore-former, was pressed at 14,000 p.s.i. and 400° F. for 2 minutes. After hot pressing the polytetrafluoroethylene sheet onto the air electrode, the electrode containing the sheet was immersed in warm water (192° F.) to remove the sodium carbonate pore-former. To ensure complete removal of the pore-former, the electrode was allowed to remain in the warm water for about 16 hours (overnight), and thereafter it was removed from the water and permitted to dry.

This electrode was tested as a half-cell in 20% potassium hydroxide electrolyte and yielded the following voltages under various loads:

Volts vs. $H_2$
| | |
|---|---|
| Open circuit | 0.980 |
| 20 ma./cm.$^2$ | 0.850 |
| 50 ma./cm.$^2$ | 0.770 |
| 100 ma./cm.$^2$ | 0.645 |
| 150 ma./cm.$^2$ | 0.455 |

Having completely described this invention, what is claimed is:

1. A method for making microporous fluorocarbon polymer sheet material comprising forming a mixture of hydrophobic fluorocarbon polymer particles selected from the group consisting of polytetrafluoroethylene, polytrifluoroethylene, polyvinyl fluoride, polyvinylidene fluoride, polytrifluorochloroethylene and copolymers thereof, a leachable particulate metallic salt pore-former and a paraffin wax material; said pore-former being present in about 3 to 7 parts by weight per part of fluorocarbon polymer and said paraffin wax ranging from about 10 to about 20% by weight of the polymer/pore-former mix; forming said mixture into a sheet material; removing said paraffin wax by treating said sheet material with a solvent therefor; heating said sheet material to a temperature sufficient to sinter said fluorocarbon polymer particles; and thereafter, removing said metallic salt pore-former with a leaching solvent which renders said sheet material microporous.

2. A method in accordance with claim 1 in which said sheet material has a thickness ranging from 5 to 40 mils.

3. A method in accordance with claim 1 in which the metallic salt pore-former particles are sufficiently fine to pass through a 200 mesh screen.

4. A method in accordance with claim 1 in which the fluorocarbon polymer is polytetrafluoroethylene.

5. A method in accordance with claim 1 in which the pore-former is sodium carbonate.

6. A method in accordance with claim 1 in which the pore-former is calcium formate.

7. A method in accordance with claim 1 in which the sheet material is placed in a cold sintering furnace after removal of the paraffin wax and is slowly heated to a temperature sufficient to sinter said fluorocarbon polymer particles.

References Cited

UNITED STATES PATENTS

| | | |
|---|---|---|
| 2,915,483 | 12/1959 | Barnhart. |
| 3,228,896 | 1/1966 | Canterino et al. 264—49 XR |
| 3,281,511 | 10/1966 | Goldsmith 264—49 |
| 2,707,201 | 4/1955 | Fernald et al. 264—49 XR |

FOREIGN PATENTS 1,275,445  10/1961  France.

PHILIP E. ANDERSON, Primary Examiner

U.S. Cl. X.R.

260—2.5; 264—127